United States Patent
Strom

(10) Patent No.: US 7,634,129 B2
(45) Date of Patent: Dec. 15, 2009

(54) DUAL-AXIS SCANNING SYSTEM AND METHOD

(75) Inventor: John T. Strom, North Bend, WA (US)

(73) Assignee: Rudolph Technologies, Inc., Flanders, NJ (US)

( * ) Notice: Subject to any disclaimer, the term of this patent is extended or adjusted under 35 U.S.C. 154(b) by 602 days.

(21) Appl. No.: 10/323,696

(22) Filed: Dec. 18, 2002

(65) Prior Publication Data

US 2003/0138139 A1 Jul. 24, 2003

Related U.S. Application Data

(60) Provisional application No. 60/346,313, filed on Dec. 28, 2001.

(51) Int. Cl.
G06K 9/00 (2006.01)
G06T 15/00 (2006.01)
H04N 13/00 (2006.01)

(52) U.S. Cl. .................. 382/154; 345/419; 348/42; 356/12; 359/462

(58) Field of Classification Search .......... 382/154, 382/141–153, 285; 356/12–14; 359/462–477, 359/811; 345/419–427; 348/42–60
See application file for complete search history.

(56) References Cited

U.S. PATENT DOCUMENTS

| | | | | |
|---|---|---|---|---|
| 4,689,491 A | * | 8/1987 | Lindow et al. | 250/559.07 |
| 5,114,226 A | * | 5/1992 | Goodwin et al. | 356/4.09 |
| 5,326,659 A | * | 7/1994 | Liu et al. | 430/5 |
| 5,463,667 A | * | 10/1995 | Ichinose et al. | 378/58 |
| 5,528,194 A | | 6/1996 | Ohtani | 382/293 |
| 5,543,832 A | * | 8/1996 | Oravecz et al. | 348/65 |
| 5,736,725 A | * | 4/1998 | Danielson | 235/462.11 |
| 5,835,241 A | * | 11/1998 | Saund | 358/488 |
| 6,020,917 A | * | 2/2000 | Oravecz et al. | 348/77 |
| 6,023,289 A | * | 2/2000 | Oravecz et al. | 348/77 |
| 6,222,937 B1 | * | 4/2001 | Cohen et al. | 382/154 |
| 6,307,674 B1 | * | 10/2001 | Sauer et al. | 359/443 |
| 6,351,573 B1 | | 2/2002 | Schneider | 382/294 |
| 6,393,141 B1 | * | 5/2002 | Cronshaw et al. | 382/141 |
| 6,518,570 B1 | | 2/2003 | Hough | 250/306 |
| 6,603,580 B1 | * | 8/2003 | Taillie | 358/474 |
| 6,834,238 B1 | | 12/2004 | Hochman | 702/21 |
| 6,885,479 B1 | * | 4/2005 | Pilu | 358/474 |
| 6,940,664 B1 | * | 9/2005 | Pilu | 359/806 |
| 2002/0031249 A1 | | 3/2002 | Komuro et al. | 382/149 |
| 2002/0051006 A1 | | 5/2002 | Katagiri et al. | 345/653 |
| 2002/0181762 A1 | * | 12/2002 | Silber | 382/154 |
| 2003/0068079 A1 | * | 4/2003 | Park | 382/154 |
| 2003/0081717 A1 | * | 5/2003 | Eppler et al. | 378/21 |
| 2003/0103277 A1 | * | 6/2003 | Mohwinkel | 359/811 |
| 2005/0199598 A1 | * | 9/2005 | Hunter et al. | 219/121.72 |

* cited by examiner

Primary Examiner—Aaron W Carter
(74) Attorney, Agent, or Firm—Dicke, Billig & Czaja, PLLC

(57) ABSTRACT

An image acquisition system and method may employ a non-orthogonal optical axis. The optical axis may be established in such a manner as to position a focal plane of an imaging device in a selected orientation relative to the object space. Such selective positioning and orientation of the focal plane allows the integration of two coordinate axes and enables dual-axis scanning of the object space. In some embodiments, the focal plane may extend throughout the entire depth dimension of the object space.

23 Claims, 5 Drawing Sheets

Object Space Scanned Through Non-orthogonal Optical Axis

DUAL-AXIS SCANNING SYSTEM AND METHOD

This application claims the benefit of U.S. provisional application Ser No. 60/346,313 entitled "DUAL-AXIS SCANNING FOR THE LOCALIZATION OF OBJECTS IN THREE-DIMENSIONAL SPACE," filed Dec. 28, 2001.

FIELD OF THE INVENTION

Aspects of the present invention relate generally to image acquisition systems and image processing techniques, and more particularly to an efficient system and method of capturing image data along a non-orthogonal optical axis.

DESCRIPTION OF THE RELATED ART

Digital imaging techniques are typically employed to facilitate identification and localization of objects in three-dimensional (3D) space; various techniques have utility in numerous applications and are used in conjunction with, for example, machine vision apparatus, manufacturing and fabrication systems, and inspection tools. Traditional image acquisition and processing methods such as deconvolution and tomography, for example, are computationally expensive and generally difficult to implement; conventional optical methods such as confocal microscopy are expensive and slow.

A conventional 3D localization technique is illustrated in FIGS. 1 and 2. Referring now to FIG. 1A, a traditional system is generally represented by reference numeral 100. In accordance with standard operating principles of system 100, finding the location of an object 199 supported on a structure 111 in 3D space (i.e., represented by x, y, and z coordinates) is generally accomplished by moving a camera or other imaging device 110 to a given x,y coordinate to image a particular section of the object space. Imaging device 110 then acquires a series of images, each at a respective focal plane 113; for each successive image, the z coordinate of focal plane 113 is changed accordingly, either by selectively adjusting (with respect to the z axis) the location of structure 111 supporting object 199, by changing the focal depth of imaging device 110 or other components of the optical system to focus into or away from the previous focal plane 113, or some combination of the foregoing.

In accordance with such an imaging strategy, both the z axis and the optical axis are orthogonal to the x and y axes. As indicated in FIG. 1B, a resulting image 171 generally captures data in a plane which is parallel to the x,y plane. A series of images 171-175 representing successive focal planes in the z direction is illustrated in FIG. 2A; such a series of images is generally referred to as a "stack" of images, and is designated by reference numeral 201.

Upon completion of image stack 201 at a given x,y coordinate (stack 201 is indicated at location $x_1,y_1$ in FIG. 2B), one or both of the x and y locations are changed or incremented, and a new stack of images is acquired. As illustrated in FIG. 2B, for example, stack 202 may be acquired at location $x_2,y_1$; imaging device may then be moved to location $x_2,y_2$, where stack 203 is acquired; and so forth. The x and y coordinates are incremented or adjusted successively until the entire object space has been sampled. Though stacks 201-204 are represented as slightly separated in FIG. 2B for clarity, it will be appreciated that system 100 is generally configured to acquire stacks 201-204 that abut each adjacent stack such that the entire object space is imaged without gaps.

Conventional systems such as those illustrated and described with reference to FIGS. 1 and 2 are difficult to implement, require complicated instrumentation and very precise motion control systems, and generally capture more images than necessary; accordingly, such systems are inefficient and unnecessarily expensive to design and operate.

SUMMARY

Embodiments of the present invention overcome the above-mentioned and various other shortcomings of conventional technology, providing an image acquisition system and method employing a non-orthogonal optical axis. As set forth in detail below, a system and method of dual-axis scanning allow rapid determination of object locations in three-dimensional space without excessive costs.

In accordance with one embodiment, for example, a method of imaging an object space comprises: supporting an object to be imaged within the object space; and acquiring image data at a focal plane positioned in a selected orientation relative to the object space along a non-orthogonal optical axis.

The supporting may comprise utilizing a structure movable along any of three axes defining the object space; additionally or alternatively, the structure may be rotatable about any of the three axes. Accordingly, the acquiring comprises selectively orienting the structure relative to an imaging device to establish the non-orthogonal optical axis. In some embodiments, the acquiring comprises selectively orienting an imaging device relative to the object space to establish the non-orthogonal optical axis. The acquiring may further comprise selectively translating the focal plane through the object space. Such selectively translating may comprise utilizing a raster scan strategy or a serpentine scan strategy, for example.

As set forth in detail below with reference to specific exemplary embodiments, the acquiring may comprise selectively positioning the focal plane to extend throughout an entire depth dimension of the object space. Efficient imaging of the entire object space may be facilitated by combining two coordinate axes. A method of imaging an object space may further comprise selectively repeating the acquiring operation.

In accordance with some embodiments of a dual-axis scanning system operative to obtain image data representing an object space, the system comprises: a structure operative to support an object to be imaged within the object space; and an imaging device selectively oriented to position a focal plane in a selected orientation relative to the object space along a non-orthogonal optical axis; the imaging device is generally operative to acquire image data at the focal plane.

As set forth in detail below, at least one of the structure and the imaging device is translatable along any of three axes defining the object space; additionally or alternatively, at least one of the structure and the imaging device is rotatable about any of the three axes. Accordingly, relative movement of the structure and the imaging device may cooperate to establish the non-orthogonal optical axis.

In some exemplary implementations, the system further comprises a control element such as a microprocessor or microcontroller, for example, operative to control the relative movement of the structure and the imaging device.

The system may further comprise an image processor operative to receive acquired image data from the imaging device. Such an image processor may be operative to normalize the image data, for example, or to synthesize image stacks from the image data.

As with the efficient method embodiments noted above, the system may be configured wherein the focal plane extends throughout an entire depth dimension of the object space.

The structure operative to support an object to be imaged within the object space may comprise a semiconductor wafer, a microscope slide, or a multi-well plate, for example.

The foregoing and other aspects of various embodiments of the present invention will be apparent through examination of the following detailed description thereof in conjunction with the accompanying drawings.

DETAILED DESCRIPTION

Figure 1A:
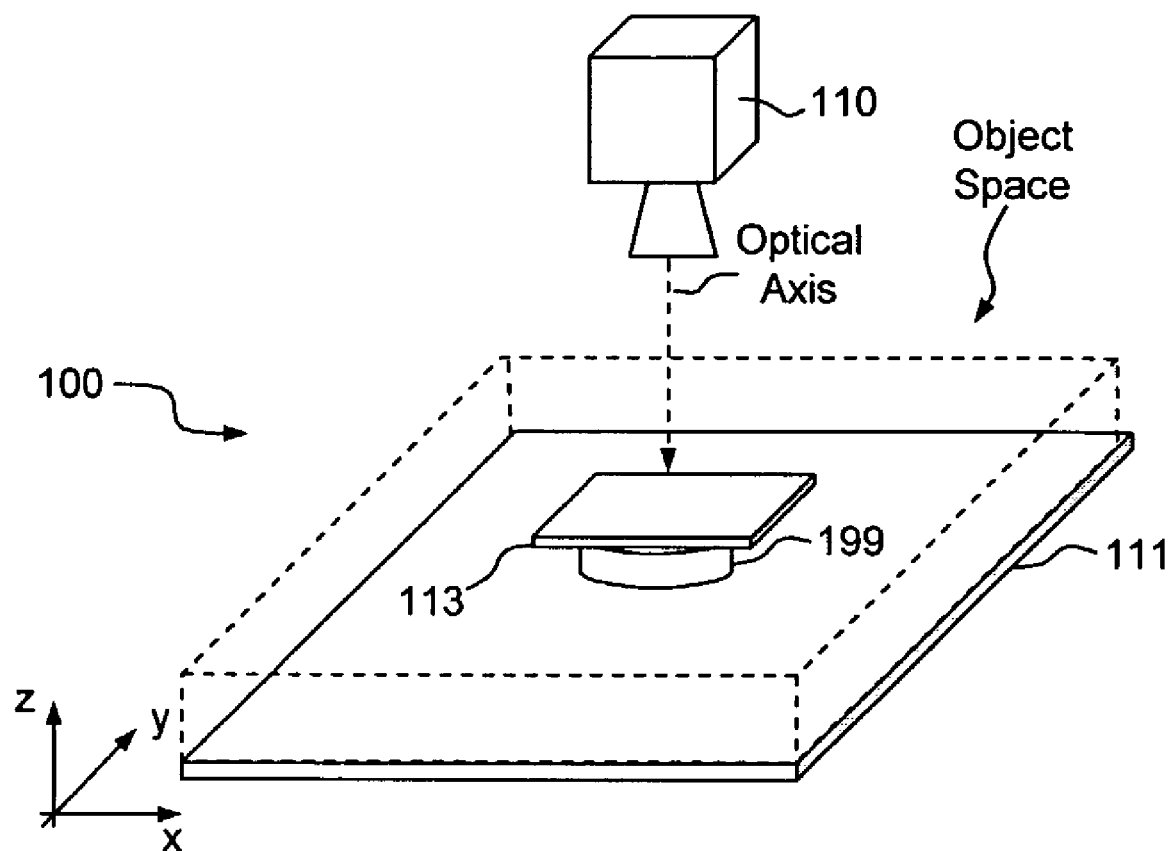
FIG. 1A is a simplified functional block diagram illustrating one embodiment of a conventional image acquisition system.
Figure 1B:
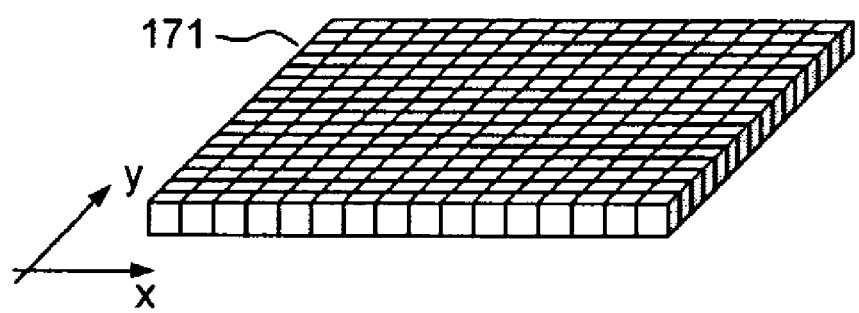
FIG. 1B is a simplified block diagram illustrating an image captured by the system of FIG. 1A.
Figure 2A:
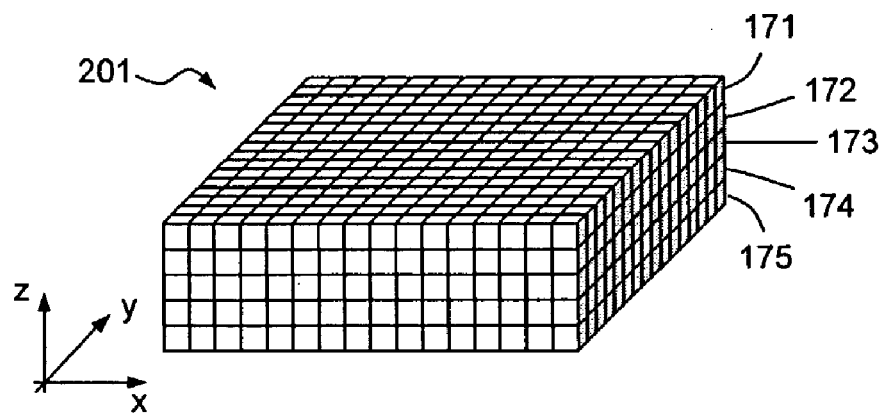
FIGS. 2A and 2B are simplified block diagrams illustrating image stacks acquired by conventional imaging systems.

As set forth above, FIG. 1A is a simplified functional block diagram illustrating one embodiment of a conventional image acquisition system, and FIG. 1B is a simplified block diagram illustrating an image captured by the system of FIG. 1A. The goal of such systems is to generate stacks of images; each stack is composed of a series of images acquired at successive z locations in the object space. In that regard, FIGS. 2A and 2B are simplified block diagrams illustrating image stacks acquired by conventional imaging systems.

Figure 2B:
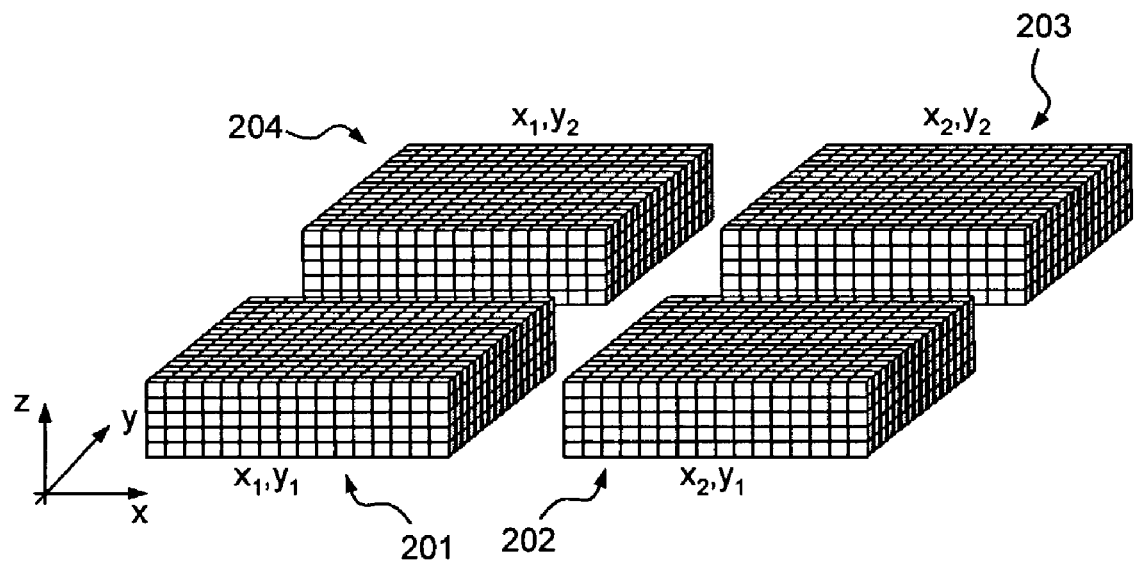

To acquire the data illustrated in FIG. 2B, a conventional system must collect twenty discrete images (ie., five images 171-175 for each of four stacks 201-204). Assuming video rate acquisition performance and similar component movement rates and settling time, then the time required to acquire these images may be estimated by the following equation:

$$\text{Time} = (\text{Total Frames}) \times (\text{Exposure} + \text{Movement} + \text{Settling})$$

For twenty frames, this equation yields a time of approximately 2.0 seconds for a conventional system operative in accordance with the parameters noted above. If the object space to be imaged is very large (e.g., requiring hundreds of total frames), then the time required to capture data for the entire space can be substantial.

Figure 3:
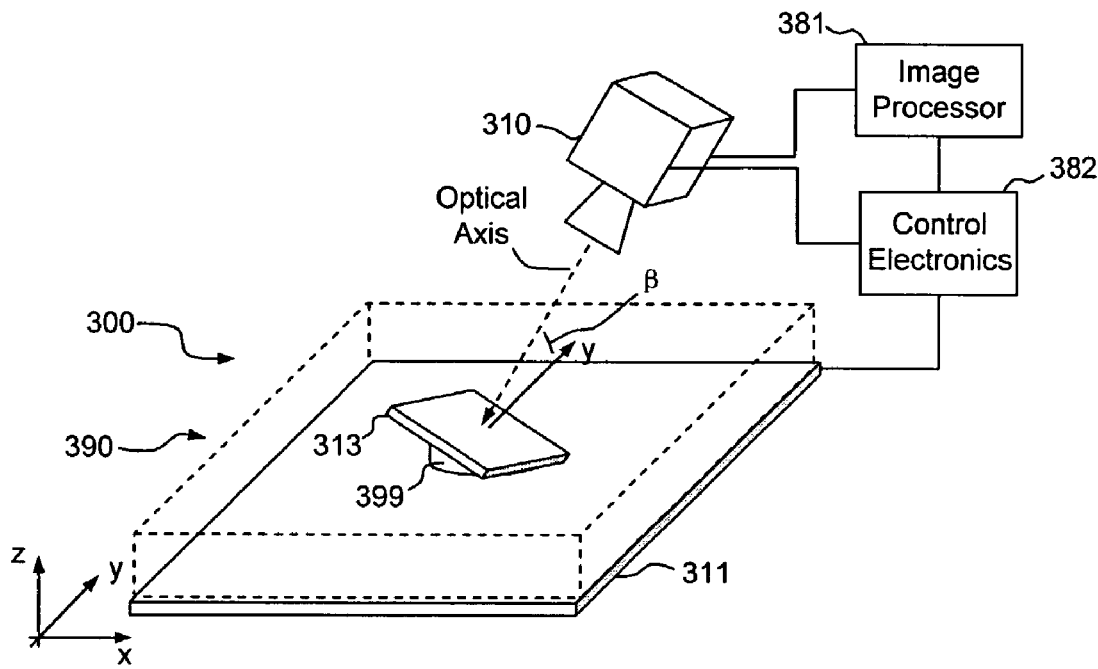
FIG. 3 is a simplified functional block diagram illustrating one embodiment of a dual-axis image acquisition system.

FIG. 3 is a simplified functional block diagram illustrating one embodiment of a dual-axis image acquisition system. In the exemplary embodiment, system 300 generally comprises an imaging device 310 operative to acquire image data of a three-dimensional (3D) object space 390, generally represented by the dashed lines. An object 399 to be imaged may be supported within object space 390, such as on a structure 311; in some embodiments, for example, structure 311 may be embodied as or comprise a microscope stage or microscopic slide, a microarray, a microtiter or other multi-well plate, a semiconductor chip, die, or wafer, or any other similar structure configured and operative to support objects, specimens, sample material, and the like for viewing or imaging.

Structure 311 may be disposed on a precision motion stage or other movable support element (not shown), and may be moved or translated by precise motion of the stage. As is generally known in the art, structure 311 may be movable in any or all of the x, y, and z directions; this movement may be accomplished through translation of structure 311 itself, through motion of any stage or other apparatus upon which structure 311 is disposed, or both. Accordingly, selective translation of structure 311 along one or more coordinate axes may allow precise positioning of object 399 within space 390. Additionally or alternatively, structure 311 may be rotatable about one or more coordinate axes. Numerous and varied apparatus and methods of providing controlled movement or translation of structure 311 are known and well within the capabilities of an ordinarily skilled artisan. The scope of the present disclosure is not intended to be limited by any structures and techniques employed to manipulate structure 311 and to position and orient object 399 within object space 390.

In some implementations, imaging device 310 may be embodied in or comprise a camera incorporating charge-coupled device (CCD) technology, for. example, or complementary metal oxide semiconductor (CMOS) image sensors. Additionally or alternatively, imaging device 310 may comprise supplementary optical elements or imaging components such as optical microscopes, scanning electron microscopes (SEM), spectrophotometers, or any other apparatus or instrument configured and operative in conjunction with image sensors or sensor arrays to acquire video or image data.

Imaging device 310 may additionally comprise or be coupled to one or more image processing components (such as image processor 381) operative to process, store, or otherwise to manipulate captured image data as desired. Image processor 381 may comprise one or more microprocessors or microcontrollers, for example, capable of executing software code or other instruction sets for interpolating, extrapolating, filtering, deconvolving, or otherwise manipulating image data captured by and transmitted from device 310. Image processor 381 may execute or run a real-time operating system, for example, enabling reconfiguration or selective programming of processor 381 functionality.

As is generally known in the art, some image processing techniques are processor intensive (i.e., computationally expensive) and require significant computing power and other resources for data manipulation and storage. Accordingly, image processor 381 may additionally comprise computer readable storage media such as: read-only memory (ROM); random access memory (RAM); hard or floppy disk drives; digital versatile disk (DVD) drives; or other magnetic, optical, or magneto-optical computer storage media and attendant hardware. Sufficient storage media may be provided to support the computational functionality of image processor 381, as well as to enable reconfiguration or selective programming thereof as noted above.

In a manner similar to that of structure 311, imaging device 310 may be movable in any or all of the x, y, and z directions; accordingly, selective movement or translation of device 310, or of one or more components thereof, along one or more coordinate axes may enable precise positioning of a focal plane 313 within object space 390. Various apparatus and methods of providing controlled movement of device 310 or providing accurate placement of focal plane 313 are generally known in the art., In that regard, device 310 may be operably coupled to guide rails or tracks, stepper motors, articulated arms, or other automated structures or robotic systems operative selectively to position device 310 for scanning operations.

Additionally, device 310, or one or more components thereof, may be rotatable about one or more of the x, y, and z coordinate axes. In that regard, device 310 may be operably coupled to or mounted on appropriate hardware such as hinges, gimbals, journal and bearing assemblies, or other pivotable structures capable of selectively orienting, supporting, and maintaining device 310 at a predetermined or dynamically adjustable angle relative to the coordinate axes. In some embodiments, selective or dynamic rotation of device 310 about one or more axes may not be necessary; in such embodiments, device 310 may be fixed at a particular angular orientation to support the functionality set forth below.

The scope of the present disclosure is not intended to be limited by any structures and techniques employed to manipulate device 310 and to position focal plane 313 within object space 390. Where structure 311 has sufficient range of motion (i.e., to position all portions of object space 390 in a location relative to device 310 suitable for imaging), for example, movement of device 310 may not be required. Alternatively, structure 311 and device 310 may be moved in a cooperating manner to enable imaging of the entirety of object space 390.

In that regard, system 300 may further comprise one or more microprocessors, microcontrollers, or other electronic devices (control electronics 382) operative to control relative movement, placement, and orientation of device 310 and structure 311. In the exemplary embodiment of FIG. 3, electronics 382 is illustrated as operably coupled to image processor 381. In some such embodiments, image processor 381 may initiate, execute, or terminate scanning or image capture operations, for example, responsive to control signals or other data (e.g., indicative of placement or relative movement of device 310 and structure 311) received from electronics 382. Similarly, control electronics 382 may receive data or instructions sets (e.g., relating to desired movements or the timing thereof) from image processor 381, and may arrange or orient device 310 and structure 311 accordingly. It will be appreciated that the functionality of image processor 381 and control electronics 382 may be combined, incorporated, or integrated into a single device or hardware arrangement.

In the exemplary embodiment, the z axis is orthogonal to the x and y axes, but the optical axis is non-orthogonal to the x,y plane, i.e., the optical axis may be selectively oriented at a first angle, $\alpha$, relative to the x axis (FIG. 4) and at a second angle, $\beta$, relative to the y axis (FIG. 3). Accordingly, the image planes (acquired at focal planes such as 313) may be selectively positioned at a desired angle relative to the lateral axes (x and y) of structure 311, i.e., at a selected orientation relative to object space 390.

It is noted that first angle $\alpha$ and second angle $\beta$ may be independently adjustable, and may be selected in accordance with any of various factors including, but not limited to: movement, placement, and precision limitations with respect to motion control of device 310 and structure 311; surface features or general configuration of structure 311; the dimensions of object space 390; the type and direction of scanning motion requested or required by image processor 381; optical capabilities of imaging device 310; and so forth. In some embodiments of system 300, second angle $\beta$ may be fixed at 90° in such simplified arrangements, the optical axis may be considered non-orthogonal to the x axis only.

In this context, the term "non-orthogonal" generally refers to the quality of being selectively oriented at some angle other than 90° relative to at least one of two axes defining a plane or surface representing one boundary of the object space, i.e., a non-orthogonal optical axis is not perpendicular to a plane defining the object space. For example, in the FIG. 3 embodiment, the x and y axes define a plane representing a surface of structure 311, which in turn functions as one boundary of object space 390. The optical axis illustrated in FIG. 3 may be considered "non-orthogonal" to the extent that it is not perpendicular to the x axis, the y axis, or both (i.e., it is not perpendicular to the x,y plane).

Figure 4:
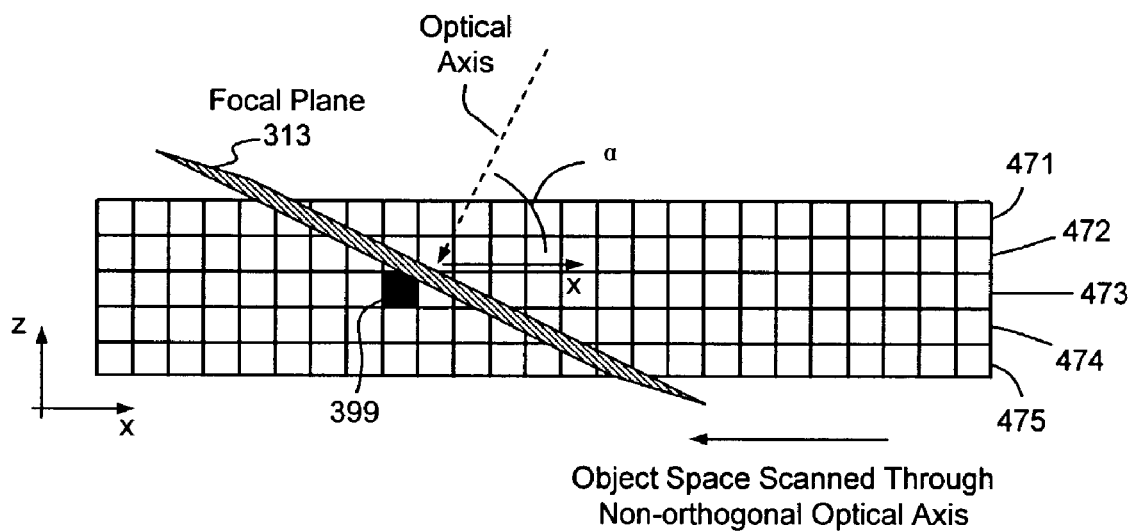
FIG. 4 is a simplified diagram illustrating one embodiment of a dual-axis scan.

Referring now to FIGS. 3 and 4, it is noted that FIG. 4 is a simplified diagram illustrating one embodiment of a dual-axis scan. As set forth above, first angle $\alpha$ and second angle $\beta$ may be adjusted, varied, or selected independently, and second angle $\beta$ may be fixed at 90° in some applications. The exemplary embodiment illustrated in FIG. 4 is operative with second angle $\beta$ not equal to 90°, though the scope and contemplation of the present disclosure are not so limited.

As described above, the angle of collection (i.e., the angle of optical axis relative to the x,y plane) may be selectively varied in accordance with numerous factors, one or more of which may be related to the optical capabilities or operational characteristics of imaging device 310. In that regard, first angle $\alpha$ in FIG. 4 may be determined as a function of, inter alia, the ratio of the axial optical resolution (i.e., along the optical axis) to the lateral optical resolution (i.e., in focal plane 313) of the optics employed at device 310 or any additional optical components used in conjunction therewith. For instance, given a 40X/0.90 NA (numerical aperture) lens, the foregoing ratio may suggest a value for first angle $\alpha$ of about 33°; as noted above, other considerations may affect selection of a value for first angle $\alpha$.

As indicated in FIG. 4, object space 390 may be scanned (e.g., from right to left in the drawing figure) using a non-orthogonal optical axis; accordingly, focal plane 313 extends in the z direction through a plurality of image layers 471-475 which generally correspond to those described above in detail with reference to FIGS. 1 and 2. Focal plane 313 also extends along the y axis, which is normal to the plane of FIG. 4. In particular, while focal plane 313 may generally be oriented to acquire x,y data, those data are acquired simultaneously across a plurality of layers in the z direction.

Scanning as indicated in FIG. 4 enables a dual-axis scanning system and method to integrate the x and z dimensions into a single axis (i.e., a combined or "dual" axis). In that regard, appropriate angular orientation of focal plane 313 may enable acquisition of data across the entire z dimension of object space 390 while simultaneously avoiding the need for component movement or translation (and attendant settling time) along the z axis, refocusing of optical elements at successive z locations, and the like. Specifically, focal plane 313 may be positioned to extend throughout an entire depth dimension (in this case, the z direction) of object space 390; in this context, the term "depth" generally refers to a direction which is substantially perpendicular to the scan direction. In accordance with dual-axis scanning methodologies, translating focal plane 313 in a particular scan direction also enables acquisition of image data in the depth direction.

Specifically, combining the x and z dimensions into a dual-axis may generally limit the motion requirements for various system components (e.g., structure 311 and device 310) to two dimensions; elimination of motion in one out of the three axial directions may reduce movement and positioning overhead by as much as 30% (or more in some applications). Additionally, since scanning of both the x and z axes occurs simultaneously, imaging operations on individual stacks of images (201-204 in FIG. 2B) are not required, enabling substantially more efficient relative motion of structure 311 and device 310 as compared with conventional systems; accordingly, as noted above, movement and positioning savings may be even greater than 30%, though only one axis of motion is eliminated.

For example, an entire row (representing the entire x range of object space 390, for example, or a portion thereof) of dual-axis images may be collected in a single continuous motion. In the FIG. 4 embodiment, for instance, the row of dual-axis images may provide image data for the portion of object space 390 equivalent to the combination of stacks 201 and 202 in FIG. 2B; image data may be acquired in a single pass or sweep in the x direction across space 390 as opposed to ten discrete motions (five images for two stacks) and attendant setting times, refocusing operations, and the like.

Upon completion of a dual-axis row such as shown in FIG. 4, the y coordinate may be incremented, decremented, or otherwise adjusted; it will be appreciated that scanning may proceed in accordance with various strategies. In some embodiments, for example, either a raster scan or serpentine scan may be implemented. As each frame of image data is collected, captured image data may be written to computer memory or to computer readable media resident, for example, at imaging device 310, image processor 381, or both. Traditional vertical stacks of images (such as represented by reference numerals 201-204 in FIG. 2B) may be assembled or synthesized from the dual-axis data by software, firmware, or other instruction sets at image processor 381. Lateral resolution may be limited by, among other factors, the motion precision of structure 311, device 310, or the combination thereof. To compensate for resolution limitations, each synthesized stack may be aligned to neighboring stacks using any one of various alignment techniques or algorithms (such as cross-correlation, for instance).

Figure 5A:
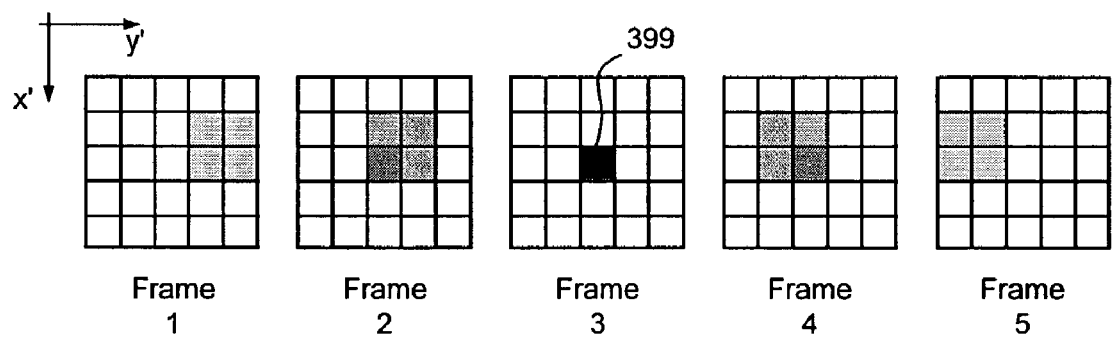
FIG. 5A is a simplified representation of successive image frames captured by the dual-axis scan of FIG. 4.

FIG. 5A is a simplified representation of successive image frames captured by the dual-axis scan of FIG. 4. In FIG. 5, the coordinates x' and y' are used to indicate that focal plane 313 is skewed (by first angle α and second angle β) as it is translated in the x direction; this skew is a function of the non-orthogonal nature of the optical axis. The apparent movement of object 399 from right to left across successive frames may be influenced by the magnitude of second angle β between the optical axis and the y axis (where $0 < \beta \leq 90°$). For small values of second angle β, the relative motion of object 399 from frame to frame will be comparatively greater than for large values of second angle β; in the case where β=90°, for instance, no lateral motion of object 399 will be detected.

Figure 5B:
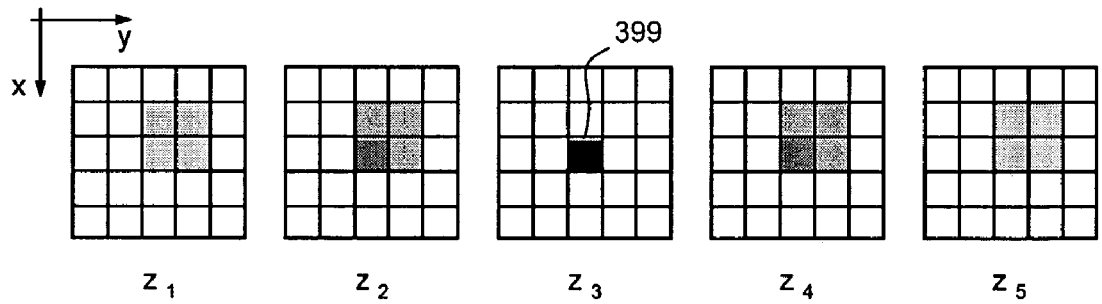
FIG. 5B is a simplified representation of successive layers of an image frame stack synthesized from data captured by the dual-axis scan of FIG. 4.

FIG. 5B is a simplified representation of successive layers of an image frame stack synthesized from data captured by the dual-axis scan of FIG. 4. Blurring may occur when object 399 does not reside in focal plane 313; such blurring may be caused by depth of field (DOF) limitations and other optical characteristics of imaging device 310.

Employing the formula set forth above to estimate scan time for a dual-axis scanning system and method, it is noted that the motion time (between frames) and the settling time factors are reduced to zero, or are minimized to such an extent that they are negligible. Accordingly, the time required to acquire an equivalent amount of image data may be estimated by the following equation:

Time=(Total Frames)×(Exposure)

It will be appreciated that the data acquisition rate is affected mostly by the exposure time requirements of the imaging device employed and by the speed with which the object space can be traversed. The net result of employing dual-axis scanning methodologies may be a reduction in the scan time by as much as 66% for equivalent data sets.

In some cases, particular features of interest (e.g., object 399) to be imaged may be on top of a non-planar support or structure 311, such as, for example, in many applications associated with semiconductor wafer manufacturing, processing, inspection, or testing. In such situations, an alignment algorithm used to synthesize the stacks of images may also construct those images relative to a reference surface on the support. For example, in semiconductor inspection, it is often desirable to measure the heights of features ("bumps") disposed on the surface of the silicon wafer or die. The features may be measured relative to this surface even though the typical silicon wafer is not necessarily planar. In conjunction with synthesizing stacks from dual-scan image data, an algorithm may normalize the z positions of imaged features relative to height of the wafer in the stack (i.e., at that particular x,y coordinate location).

Figure 6:
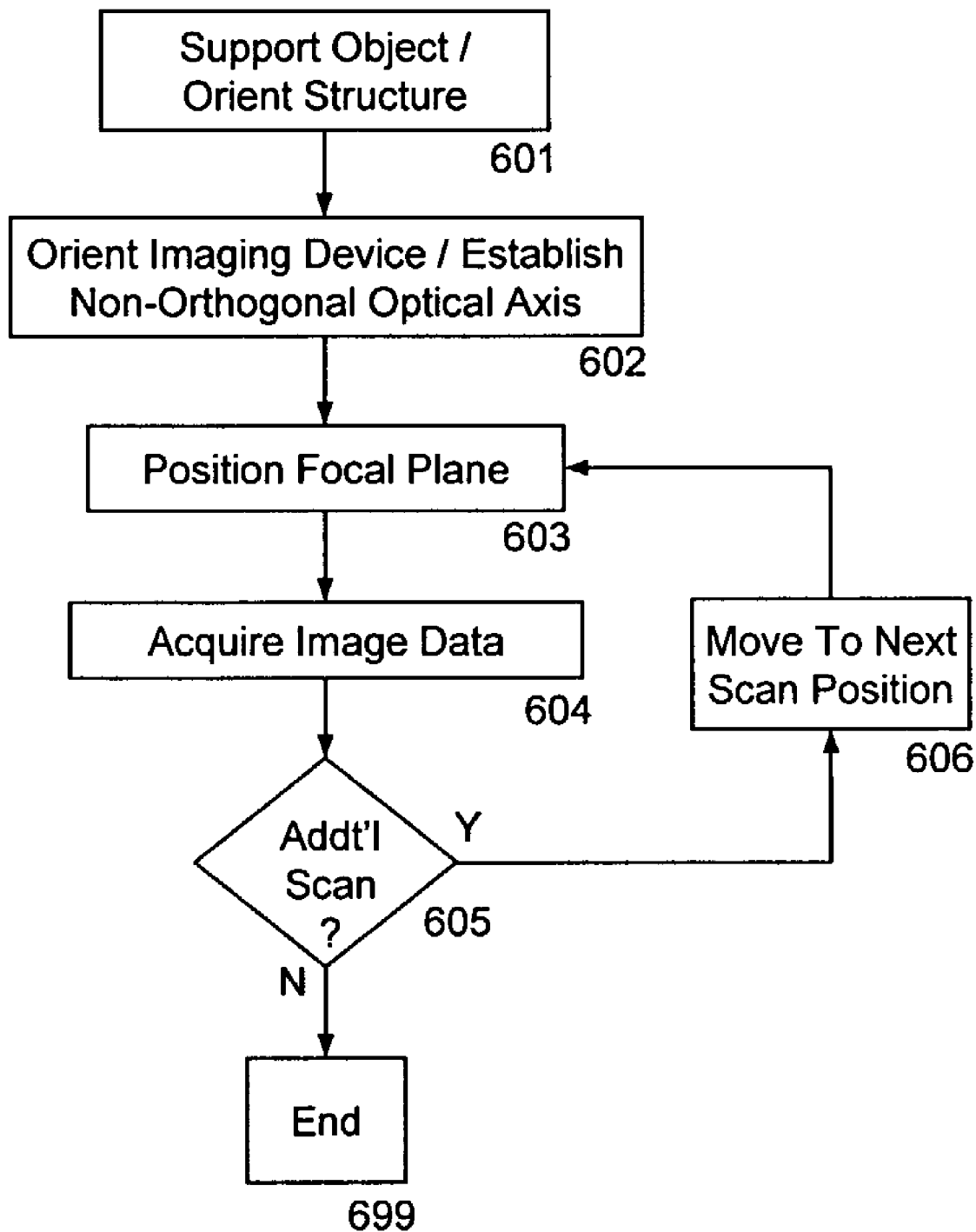
FIG. 6 is a simplified flow diagram illustrating the general operation of one embodiment of a dual-axis scanning method.

FIG. 6 is a simplified flow diagram illustrating the general operation of one embodiment of a dual-axis scanning method. As indicated in FIG. 6, a object to be imaged may be supported on a structure within the object space (block 601). The structure may be oriented or arranged to facilitate imaging as set forth in detail above. In that regard, a structure supporting the object may be movable or translatable along any of three axes defining the object space; additionally, the structure may be rotatable about any of those axes.

As indicated at block 602, an imaging device may be oriented relative to the object space in general, or the support structure in particular, to establish a non-orthogonal optical axis. In some embodiments, both the support structure and the imaging device may be moved relative to each other, facilitating establishment of a desired, optimal, or other predetermined angle for the non-orthogonal optical axis.

Specifically, the optical axis may be established in such a manner as to position a focal plane of the imaging device in a selected orientation relative to the object space (block 603). Such selective positioning and orientation of the focal plane allows the integration of two coordinate axes and enables dual-axis scanning of the object space. In the embodiment described above in detail with reference to FIGS. 3-5, for example, the focal plane may extend throughout the entire depth dimension of the object space.

Image data may be acquired as indicated at block 604. Data acquisition may be facilitated or enabled by a CCD or CMOS camera, for example, embodied or integrated in the imaging device. As noted above, image data are acquired at the focal plane, the angular orientation of which is determined by the non-orthogonal optical axis.

In some embodiments, the entirety of the object space may be scanned such that image data are acquired for all portions thereof. Depending upon, for example, the dimensions of the object space, the lateral resolution of the imaging device, the size of each acquired image frame, and other optical characteristics or system parameters, more than one scan or pass may be required to image the entire object space. In that regard, a determination may be made as indicated at decision block 605. Where another scan is not required (e.g., the entire object space has already been imaged, or a particular object of interest has been identified and located) as determined at decision block 605, the imaging process may end (block 699).

Where another scan is required as determined at decision block 605, however, the imaging operation may loop back to block 603. In that regard, control may pass to block 606, which represents movement of the imaging device, the supporting structure, or both, i.e., these components may be repositioned in preparation for subsequent scanning. Specifically, the focal plane may be repositioned (block 603) at a new scan location, and imaging may continue.

As set forth in detail above, some or all the foregoing movements, orientations, acquisitions, and determinations may be accomplished under control of, or may be influenced by, software code or computer executable instructions resident at an image processor, a control element or device, or both. Various methods and apparatus for motion control and precise relative positioning of structural components are generally known in the art of image processing.

The FIG. 6 embodiment is presented for illustrative purposes only, and is not intended to imply an order of operations to the exclusion of other possibilities. By way of specific example, the operations depicted at blocks 602 and 603 may be reversed in order, for instance, or combined to occur substantially simultaneously; in accordance with one such alternative, an optimum or selected angular orientation of the focal plane may be determined prior to orientation of the imaging apparatus. Those of skill in the art will appreciate that the particular sequence in which the operations depicted in FIG. 6 are conducted may be influenced by, among other factors, the functionality and structural configuration of a particular imaging device or image processor, the operational characteristics and limitations of the motion control element or any movable structures associated therewith, or some combination thereof.

The present invention has been illustrated and described in detail with reference to particular embodiments by way of example only, and not by way of limitation. Those of skill in the art will appreciate that various modifications to the exemplary embodiments are within the scope and contemplation of the present disclosure. Accordingly, it is intended that the present invention be limited only by the scope of the appended claims.

What is claimed is:

1. A method of imaging an object space; said method comprising:
   supporting an object to be imaged within said object space;
   positioning a focal plane in a selected orientation relative to said object space along a non-orthogonal optical axis wherein at least part of said focal plane lies within said object space;
   acquiring image data at said focal plane, wherein said acquiring image data includes acquiring image data along a depth dimension of said object space while said focal plane is maintained in said selected orientation;
   selectively translating said focal plane through said object space while said focal plane is maintained in said selected orientation, said translating being along an axis not coincident with the non-orthogonal optical axis; and,
   constructing a three dimensional image of the object space from the image data.

2. The method of claim 1 wherein said supporting comprises utilizing a structure movable along any of three axes defining said object space.

3. The method of claim 2 wherein said structure is rotatable about any of said three axes.

4. The method of claim 3 wherein said acquiring comprises selectively orienting said structure relative to an imaging device to establish said non-orthogonal optical axis.

5. The method of claim 1 wherein said acquiring comprises selectively orienting an imaging device relative to said object space to establish said non-orthogonal optical axis.

6. The method of claim 1 wherein said selectively translating comprises utilizing a raster scan strategy.

7. The method of claim 1 wherein said selectively translating comprises utilizing a serpentine scan strategy.

8. The method of claim 1 wherein said acquiring comprises selectively positioning said focal plane to extend throughout an entire depth dimension of said object space.

9. The method of claim 1 further comprising selectively repeating said acquiring.

10. A dual-axis scanning system operative to obtain image data representing an object space; said system comprising:
    a structure operative to support an object to be imaged within said object space; and
    an imaging device selectively oriented to position a focal plane in a selected orientation relative to said object space along a non-orthogonal optical axis wherein at least part of said focal plane lies within said object space;
    said imaging device operative to acquire image data at said focal plane and along a depth dimension of said object space as said focal plane is translated through said object space at an inclination to the translation such that stacks of images of said object space can be synthesized, wherein a stack describes three-dimensional object space.

11. The system of claim 10 wherein at least one of said structure and said imaging device is translatable along any of three axes defining said object space.

12. The system of claim 11 wherein at least one of said structure and said imaging device is rotatable about any of said three axes.

13. The system of claim 12 wherein relative movement of said structure and said imaging device cooperate to establish said non-orthogonal optical axis.

14. The system of claim 13 further comprising a control element operative to control said relative movement.

15. The system of claim 10 further comprising an image processor operative to receive acquired image data from said imaging device.

16. The system of claim 15 wherein said image processor is operative to normalize said image data.

17. The system of claim 15 wherein said image processor is operative to synthesize image stacks from said image data.

18. The system of claim 10 wherein said focal plane extends throughout an entire depth dimension of said object space.

19. The system of claim 10 wherein said structure comprises a semiconductor wafer.

20. The system of claim 10 wherein said structure comprises a microscope slide.

21. The system of claim 10 wherein said structure comprises a multi-well plate.

22. The method of claim 1 wherein said selectively translating comprises repeating said acquiring.

23. The method of claim 1 and further comprising:
    synthesizing stacks of images from the acquired image data wherein a stack includes acquired image data from multiple positions of said focal plane.

* * * * *

UNITED STATES PATENT AND TRADEMARK OFFICE
CERTIFICATE OF CORRECTION

| | | |
|---|---|---|
| PATENT NO. | : 7,634,129 B2 | Page 1 of 1 |
| APPLICATION NO. | : 10/323696 | |
| DATED | : December 15, 2009 | |
| INVENTOR(S) | : John T. Strom | |

It is certified that error appears in the above-identified patent and that said Letters Patent is hereby corrected as shown below:

Column 5, line 64, delete "90° in" and insert in place thereof --90°; in--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,634,129 B2  Page 1 of 1
APPLICATION NO. : 10/323696
DATED : December 15, 2009
INVENTOR(S) : John T. Strom It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Ninth Day of November, 2010

David J. Kappos
*Director of the United States Patent and Trademark Office*